United States Patent
Hosokawa

(10) Patent No.: US 7,843,787 B2
(45) Date of Patent: Nov. 30, 2010

(54) RECORDING APPARATUS

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 12/020,221

(22) Filed: Jan. 25, 2008

(65) Prior Publication Data

US 2008/0198718 A1 Aug. 21, 2008

(30) Foreign Application Priority Data

Feb. 20, 2007 (JP) ............................. 2007-039874
Dec. 26, 2007 (JP) ............................. 2007-335220

(51) Int. Cl.
*G11B 7/00* (2006.01)
(52) U.S. Cl. .............. 369/53.31; 369/47.32; 369/47.15; 369/47.33
(58) Field of Classification Search ............... 369/53.31
See application file for complete search history.

(56) References Cited

U.S. PATENT DOCUMENTS

| 5,761,180 | A | * | 6/1998 | Murabayashi et al. .... 369/53.44 |
| 5,815,472 | A | | 9/1998 | Kuroda et al. |
| 6,356,515 | B1 | * | 3/2002 | Kumita et al. ............ 369/13.26 |
| 6,678,227 | B1 | * | 1/2004 | Kondo et al. ............. 369/47.33 |
| 7,619,953 | B2 | * | 11/2009 | Shiina ..................... 369/47.15 |
| 2005/0068869 | A1 | * | 3/2005 | Sugiyama et al. ........ 369/47.32 |
| 2006/0120234 | A1 | * | 6/2006 | Aono et al. ................ 369/47.1 |
| 2007/0070858 | A1 | * | 3/2007 | Taranishi et al. ........... 369/100 |

FOREIGN PATENT DOCUMENTS

| CN | 1542799 A | 11/2004 |
| JP | 8-007369 A | 1/1996 |

* cited by examiner

*Primary Examiner*—Van N Chow
(74) *Attorney, Agent, or Firm*—Canon U.S.A., Inc. I.P. Division

(57) ABSTRACT

A recording apparatus includes a write unit to write information data read from a memory by irradiating a disk medium with a beam in accordance with the information data, and a control unit to, upon the amount of information data stored in the memory reaching a threshold, instruct the write unit to start writing of the information data. In response to the write instruction, the write unit reads the information data stored in the memory and writes the read information data onto the disk medium while it is rotating. Upon the amount of information data in the memory decreasing to a predetermined value, the write unit stops reading and writing of the information data from the memory and onto the disk medium. The control unit sets a value of the threshold in accordance with the number of times the write unit has performed writing of the information data.

9 Claims, 10 Drawing Sheets

RECORDING APPARATUS

BACKGROUND OF THE INVENTION

1. Field of the Invention

The present invention relates to recording apparatuses, and more particularly, to a technology suitable for recording data onto a recording medium by irradiating the recording medium with an optical beam.

2. Description of the Related Art

Recording apparatuses for recording and playing back various types of information data, such as moving image data, by irradiating an optical disk with a laser beam have been known. In order to record data onto an optical disk, a laser power that is higher than the laser power used for playing back the data is necessary. If the laser power used for recording is not sufficient, writing becomes unstable and an increased number of errors may be found in playback data. In contrast, if a higher laser power is used for recording, writing can be successfully performed. However, since the effective diameter of a laser beam is large in such a case, neighboring data recorded in the vicinity may not be played back accurately.

Thus, laser power to be used for recording must be set to an optimal value. Under such circumstances, a magneto-optical disk apparatus for adjusting laser power to be applied to an optical disk is disclosed, for example, in Japanese Patent Laid-Open No. 8-7369.

In addition, in the case of recording data onto an optical disk, the optical disk must be rotating stably at a predetermined speed. Thus, in order to record data onto an optical disk accurately, rotation control for causing the optical disk to rotate stably at a predetermined speed, as well as adjustment of laser power, is required.

In addition, in recent years, due to an improvement in the data record rate for optical disks, writing to an optical disk can be achieved at a record rate that is several times faster than a rate of storing data to be recorded to a memory. Thus, for example, in the case of recording moving image data onto an optical disk, a configuration in which, when the amount of moving image data temporarily stored in a memory reaches a predetermined value, the stored moving image data is read from the memory and written to the optical disk, is normally adopted.

FIGS. 10A to 10C are illustrations each showing a change in the amount of moving image data stored in a memory. In the examples shown in FIGS. 10A to 10C, the data write rate for an optical disk is higher than the data storage rate for the memory.

Thus, as shown in FIG. 10A, after writing of data to the optical disk is started, the amount of data stored in the memory gradually decreases. Then, at a point in time when the amount of data stored in the memory becomes smaller than a writing stop threshold, which is used for stopping writing, writing to the optical disk is stopped.

In the case of intermittently writing data to an optical disk as described above, processing, such as adjustment of the recording position on the optical disk, as well as the actual data writing operation, is required. During such a processing period, data writing cannot be performed, resulting in wasted time. Thus, in the case of intermittently writing data as described above, increasing the amount of data to be written in a single recording operation may reduce an amount wasted time.

However, writing of moving image data cannot be started until an optical disk rotates at a desired speed, and moving image data during such a waiting time period is stored in a memory. In addition, an optimal laser power varies depending on the temperature of an optical disk. Thus, when the temperature of the optical disk changes, laser power must be adjusted before data writing is started.

Consequently, during the period in which adjustment of laser power is performed, data writing cannot be performed. Thus, moving image data during such an adjustment period is stored in the memory.

As a result, as shown in FIG. 10C, writing to the disk cannot be started at time 1004 when the amount of data stored in the memory exceeds a writing start threshold, which is used for starting writing, thus causing overflow of moving image data. Thus, a memory having a larger capacity is necessary. This causes a problem of an increase in the cost of an apparatus.

It is desirable that, while recording is stopped, rotation of the optical disk is stopped to reduce power consumption.

Thus, in a case where a recording operation is performed for the first time since the start of recording, a long time is required to achieve a desired rotation speed of an optical disk compared with the second and subsequent recording operations. In contrast, in a case where the second and subsequent writing operations are performed based on intermittent recording, a desired speed can be achieved quickly compared with the first writing operation.

In addition, adjustment of laser power is not necessarily performed before data writing is started. The adjustment of laser power can be performed only in a case where a large temperature change occurs. As described above, it is not desirable to prepare a large-capacity memory only for laser power adjustment or for performance of the first writing operation.

Thus, as described above, in order to prevent overflow of moving image data in a memory, a threshold for starting writing to an optical disk may be set to a low level.

However, if the threshold for starting writing is set to a low level, writing start and writing stop are frequently repeated, as shown in FIG. 10B.

This causes a problem in which the duration of a period required to perform processing, such as adjustment of a recording position on an optical disk, increases.

SUMMARY OF THE INVENTION

An embodiment of the present invention is directed to a recording apparatus that is capable of preventing or at least mitigating overflow of moving image data stored in a memory and preventing or at least mitigating an increase in the overhead associated with a writing operation to write the moving image data read from the memory onto a disk-type recording medium.

Further features of the present invention will become apparent from the following description of exemplary embodiments with reference to the attached drawings.

DESCRIPTION OF THE EMBODIMENTS

Embodiments of the present invention will be described with reference to the drawings.

First Embodiment

Figure 1:
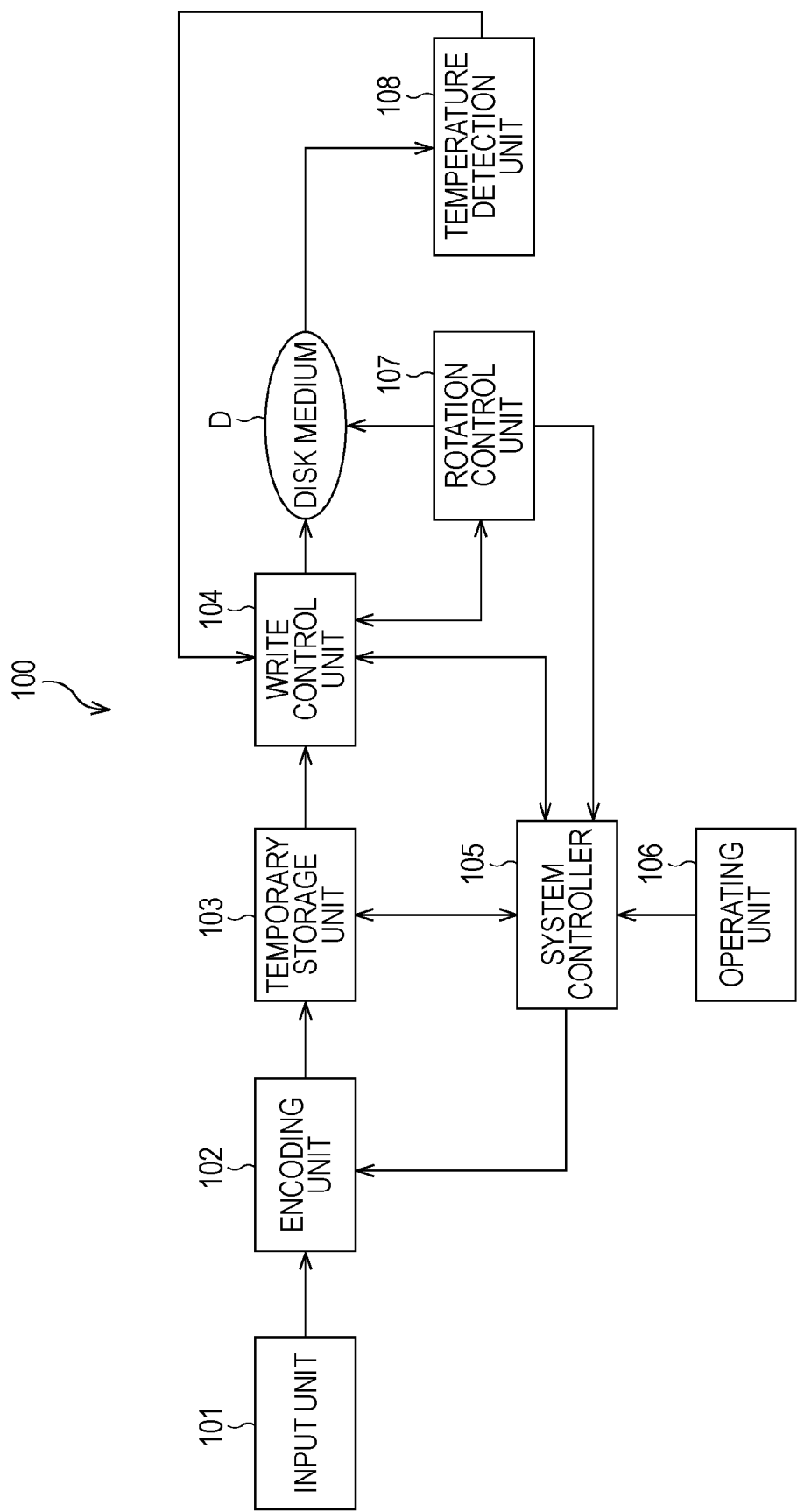
FIG. 1 shows the configuration of a recording apparatus according to a first embodiment of the present invention.

FIG. 1 is a block diagram showing an example of the functional configuration of a recording apparatus 100 according to a first embodiment of the present invention.

Referring to FIG. 1, in the recording apparatus 100, an input unit 101 receives moving image data from, for example, an external source and outputs the received moving image data to an encoding unit 102. The encoding unit 102 encodes the received moving image data in accordance with a suitable encoding method, such as a moving picture experts group (MPEG) method, to compress the amount of information of the moving image data, and outputs the encoded moving image data to a temporary storage unit 103. The temporary storage unit 103 includes a memory, such as a dynamic random access memory (DRAM), and temporarily stores the encoded moving image data. A write control unit 104 writes the moving image data to an optical disk D. The write control unit 104 will be described in more detail below.

A system controller 105 controls operations of various functional units of the recording apparatus 100 in accordance with an instruction from an operating unit 106. In the first embodiment, the write control unit 104 and the system controller 105 are connected to each other through an AT Attachment/AT Attachment Packet Interface (ATA/ATAPI). The operating unit 106 includes various switches, such as a power switch and a trigger switch for enabling a user to input an instruction to start or stop recording.

A rotation control unit 107 rotates the disk D at a predetermined speed with a spindle motor in accordance with an instruction from the write control unit 104. A temperature detection unit 108 detects the surface temperature of the disk D and outputs the detected surface temperature to the write control unit 104. It may be difficult to directly measure the surface temperature of the disk D. Thus, in the first embodiment, a temperature sensor is provided in a predetermined position near a face of the disk D to which a laser beam is applied, and an output of the temperature sensor is used as the surface temperature of the disk D.

The write control unit 104 will be described with reference to FIG. 2.

Figure 2:
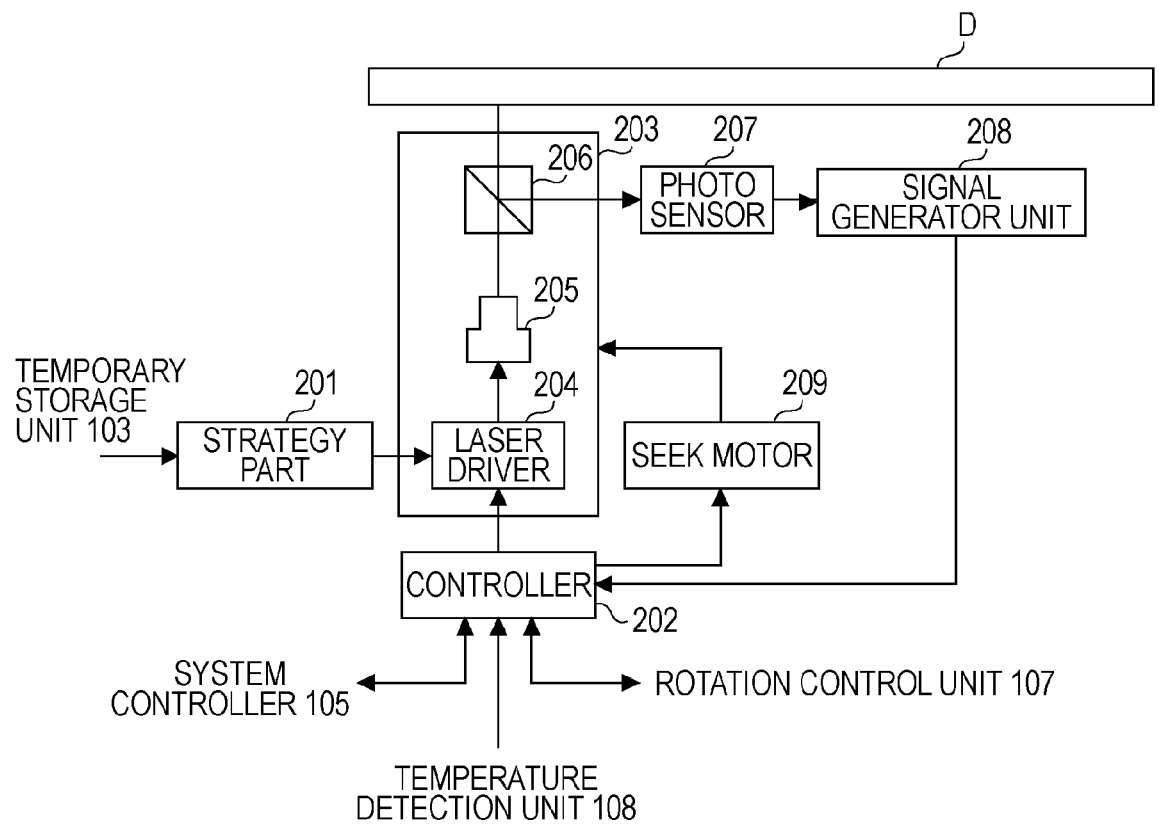
FIG. 2 shows the configuration of a write control unit.

FIG. 2 is a block diagram showing the configuration of the write control unit 104.

Referring to FIG. 2, a strategy part 201 reads moving image data from the temporary storage unit 103 in accordance with an instruction from a controller 202. The strategy part 201 modulates the read moving image data and transmits the modulated moving image data to a laser driver 204. The laser driver 204 controls a laser beam diode 205 in accordance with a modulation result obtained from the strategy part 201, and irradiates the disk D with a laser beam through a splitter 206. The laser driver 204, the laser beam diode 205, and the splitter 206 form a pickup unit 203. A seek motor 209 moves the pickup unit 203 in a direction of the radius of the disk D to a desired track on the disk D in accordance with an instruction from the controller 202.

A photo sensor 207 receives light reflected from the disk D at the time of laser power adjustment, which will be described later, converts the reflected light into an electric signal, and outputs the obtained electric signal to a signal generator 208. The signal generator 208 generates a signal suitable for laser power adjustment from the electric signal received from the photo sensor 207, and outputs the generated signal to the controller 202.

The controller 202 controls various parts of the write control unit 104 in accordance with a writing start command received from the system controller 105. As described later, the controller 202 receives temperature information from the temperature detection unit 108, and performs laser-power adjusting processing. The controller 202 controls disk rotation performed by the rotation control unit 107 and controls writing to the disk D in accordance with the rotation state of the disk.

With a loading/unloading mechanism, which is not shown, the disk D can be easily loaded and unloaded to and from the recording apparatus 100 according to the first embodiment. When a new disk D is installed, the system controller 105 instructs the write control unit 104 to perform laser-power adjusting processing. The write control unit 104 performs the laser-power adjusting processing in accordance with the instruction from the system controller 105.

In the laser-power adjusting processing, the controller 202 moves the pickup unit 203 to a region of the disk D for laser power adjustment, and writes adjustment data to the disk D while changing laser power. The photo sensor 207 reads the adjustment data, and an optimal laser power is set on the basis of the read result. Normally, several seconds is required to adjust laser power.

The controller 202 stores temperature information output from the temperature detection unit 108 at that time in association with an optimal laser power in an internal register.

Figure 3:
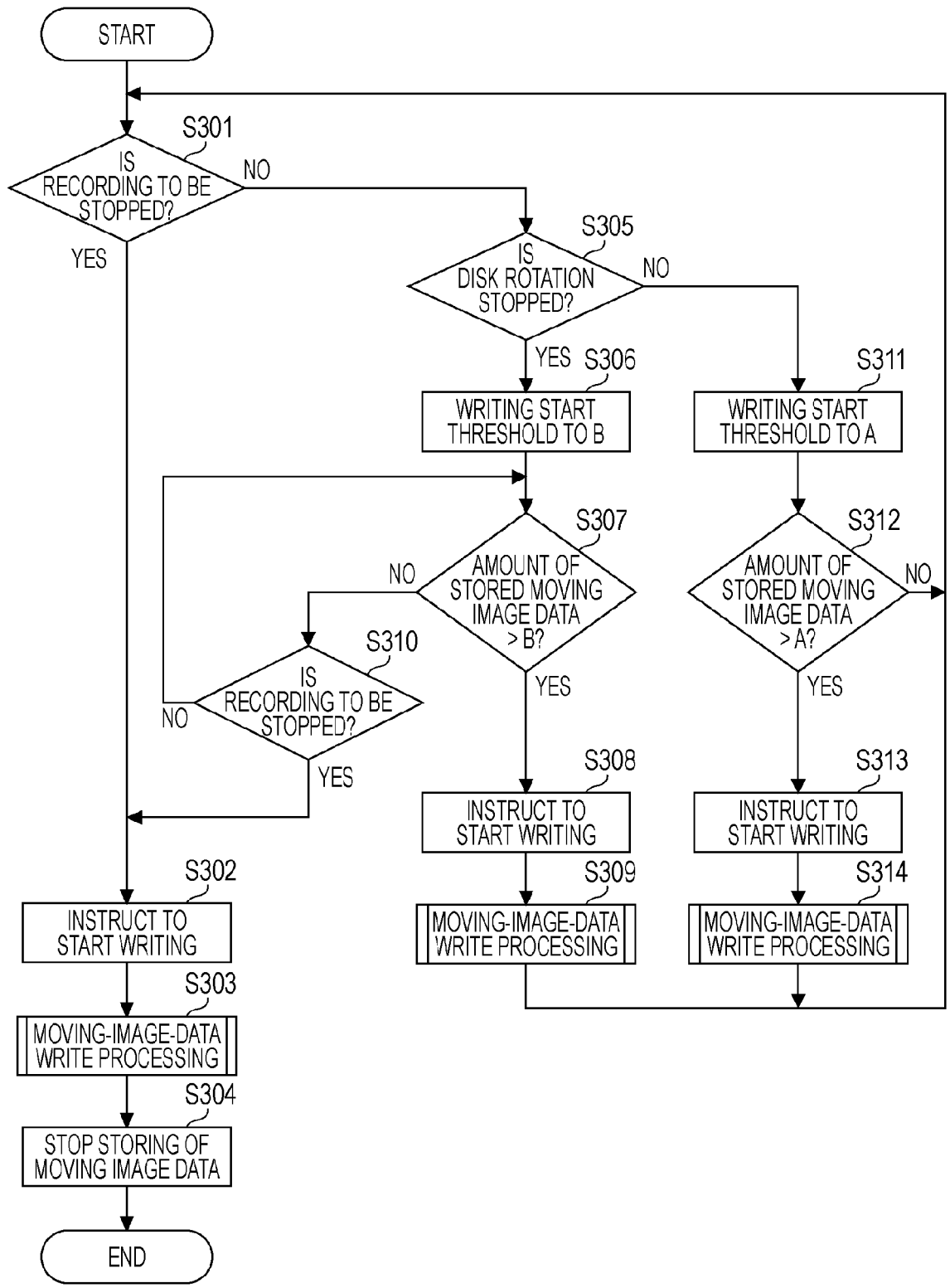
FIG. 3 is a flowchart showing a process performed at the time of recording.

A recording process performed by the recording apparatus 100 according to the first embodiment will be described with reference to flowcharts shown in FIGS. 3 and 4. The process shown in FIG. 3 is attained when the system controller 105 controls the units of the recording apparatus 100.

Upon receiving a recording instruction from a user via the operating unit 106, the encoding unit 102 starts encoding of moving image data, and the encoded moving image data is stored into the temporary storage unit 103. The system controller 105 sequentially acquires the amount of moving image data stored in the temporary storage unit 103.

In this state, it is checked whether an instruction to stop recording has been issued from the user (step S301).

If it is determined in step S301 that an instruction to stop recording has not been issued (if the determination in step S301 is NO), information indicating whether the disk D is rotating is received from the rotation control unit 107, and it is determined whether the rotation of the disk D is stopped (step S305).

If it is determined in step S305 that the rotation of the disk D is stopped (if the determination in step S305 is YES), a writing start threshold, which is used for starting writing, is set to a threshold B (step S306). Then, it is determined whether the amount of moving image data stored in the temporary storage unit 103 exceeds the threshold B (step S307).

If it is determined in step S307 that the amount of moving image data stored in the temporary storage unit 103 exceeds the threshold B (if the determination in step S307 is YES), a writing start command is output to the write control unit 104 (step S308). Then, the write control unit 104 performs write processing (step S309).

The write processing of step S309 will be described with reference to the flowchart shown in FIG. 4. The write processing shown in FIG. 4 is attained when the controller 202 shown in FIG. 2 controls the parts of the write control unit 104.

The rotation control unit 107 is instructed to rotate the disk D at a predetermined desired rotation speed (step S401). Information indicating the rotation state of the disk D is acquired from the rotation control unit 107, and it is determined whether the disk D is rotating at the desired speed (step S402). If it is determined in step S402 that the disk D is rotating at the desired speed (if the determination in step S402 is YES), it is determined whether a difference between the temperature of the disk D at the time of laser power adjustment and the current temperature of the disk D exceeds a temperature threshold in accordance with temperature information received from the temperature detection unit 108 (step S403).

If it is determined in step S403 that the temperature difference does not exceed the threshold (if the determination in step S403 is NO), moving image data is read from the temporary storage unit 103. Then, the disk D is irradiated with a laser beam, and writing of moving image data to the disk D is started (step S404).

In the first embodiment, the data write rate for the disk D is higher than the data storage rate for the temporary storage unit 103. For example, in an embodiment, double-speed writing can be achieved. Thus, after writing is started, the amount of moving image data stored in the temporary storage unit 103 gradually decreases. It is determined whether the amount of moving image data stored in the temporary storage unit 103 is smaller than a threshold C, which is smaller than the threshold B (step S405). If it is determined in step S405 that the amount of data is equal to or larger than the threshold C (if the determination in step S405 is NO), data writing to the disk D is continued.

If it is determined in step S405 that the amount of data stored in the temporary storage unit 103 is smaller than the threshold C (if the determination in step S405 is YES), reading of moving image data from the temporary storage unit 103 is stopped, and writing of data to the disk D is stopped (step S406). Then, information indicating that writing of data to the disk D is stopped is output to the system controller 105 (step S407).

Then, it is determined whether a writing start command is output from the system controller 105 (step S408). If it is determined in step S408 that a writing start command is not output from the system controller 105 (if the determination in step S408 is NO), it is determined whether a predetermined time has passed since the stopping of writing (step S409). If it is determined in step S409 that the predetermined time has passed (if the determination in step S409 is YES), the rotation control unit 107 is instructed to stop the rotation of the disk D so as to reduce power consumption (step S410).

If it is determined in step S402 that the disk D is not rotating at the desired speed (if the determination in step S402 is NO), it is determined whether moving image data stored in the temporary storage unit 103 overflows (step S415). If it is determined in step S415 that the moving image data overflows from the temporary storage unit 103 (if the determination in step S415 is YES), information indicating the occurrence of overflow is output to the system controller 105 (step S414), and the process returns to step S401.

If it is determined in step S403 that the temperature difference exceeds the threshold (if the determination in step S403 is YES), laser-power adjusting processing is performed (step S411). Then, it is determined whether adjustment has been completed (step S412). If it is determined in step S412 that adjustment has been completed (if the determination in step S412 is YES), the process proceeds to step S404 to perform writing.

If it is determined in step S412 that adjustment has not been completed (if the determination in step S412 is NO), it is determined whether moving image data stored in the temporary storage unit 103 overflows (step S413). If it is determined in step S413 that the moving image data overflows from the temporary storage unit 103 (if the determination in step S413 is YES), information indicating the occurrence of overflow is output to the system controller 105 (step S414). Then, the process returns to step S401.

After the write processing of step S309 is terminated, the process returns to step S301.

If it is determined in step S307 that the amount of moving image data stored in the temporary storage unit 103 does not exceed the threshold B (if the determination in step S307 is NO), it is determined whether an instruction to stop recording has been issued (step S310). If it is determined in step S310 that an instruction to stop recording has not been issued (if the determination in step S310 is NO), the process returns to step S307. If it is determined in step S310 that an instruction to stop recording has been issued (if the determination in step S310 is YES), a writing start command to start writing of moving image data is output to the write control unit 104 (step S302). Then, write processing for the disk D is performed (step S303). The write processing of step S303 is almost similar to the processing shown in FIG. 4. However, in the write processing of step S303, the determination of step S405 is not performed. In the write processing of step S303, after writing of all the moving image data stored in the temporary storage unit 103 to the disk D is completed, writing to the disk D is stopped. Then, storing of moving image data into the temporary storage unit 103 is stopped (step S304).

If it is determined in step S305 that the disk D is rotating (if the determination in step S305 is NO), the writing start threshold for the temporary storage unit 103 is set to a threshold A, which is larger than the threshold B (step S311). Then, it is determined whether the amount of moving image data stored in the temporary storage unit 103 exceeds the threshold A (step S312).

If it is determined in step S312 that the amount of moving image data stored in the temporary storage unit 103 exceeds the threshold A (if the determination in step S312 is YES), a writing start command is output to the write control unit 104 (step S313). Then, the write control unit 104 performs write processing (step S314). The write processing of step S314 is similar to the processing shown in FIG. 4.

If it is determined in step S312 that the amount of moving image data stored in the temporary storage unit 103 does not exceed the threshold A (if the determination in step S312 is NO), the process returns to step S301.

If it is determined in step S301 that an instruction to stop recording has been issued (if the determination in step S301 is YES), a writing start command to start writing of moving image data is output to the write control unit 104 (step S302). Then, the write processing for the disk D is performed (step S303). Then, storing of moving image data into the temporary storage unit 103 is stopped (step S304).

In the first embodiment, the predetermined time, which is used in the determination of step S409, is set to be longer than the time required for an increase in the amount of moving image data stored in the temporary storage unit 103 from the threshold C to the threshold A.

Figure 4:
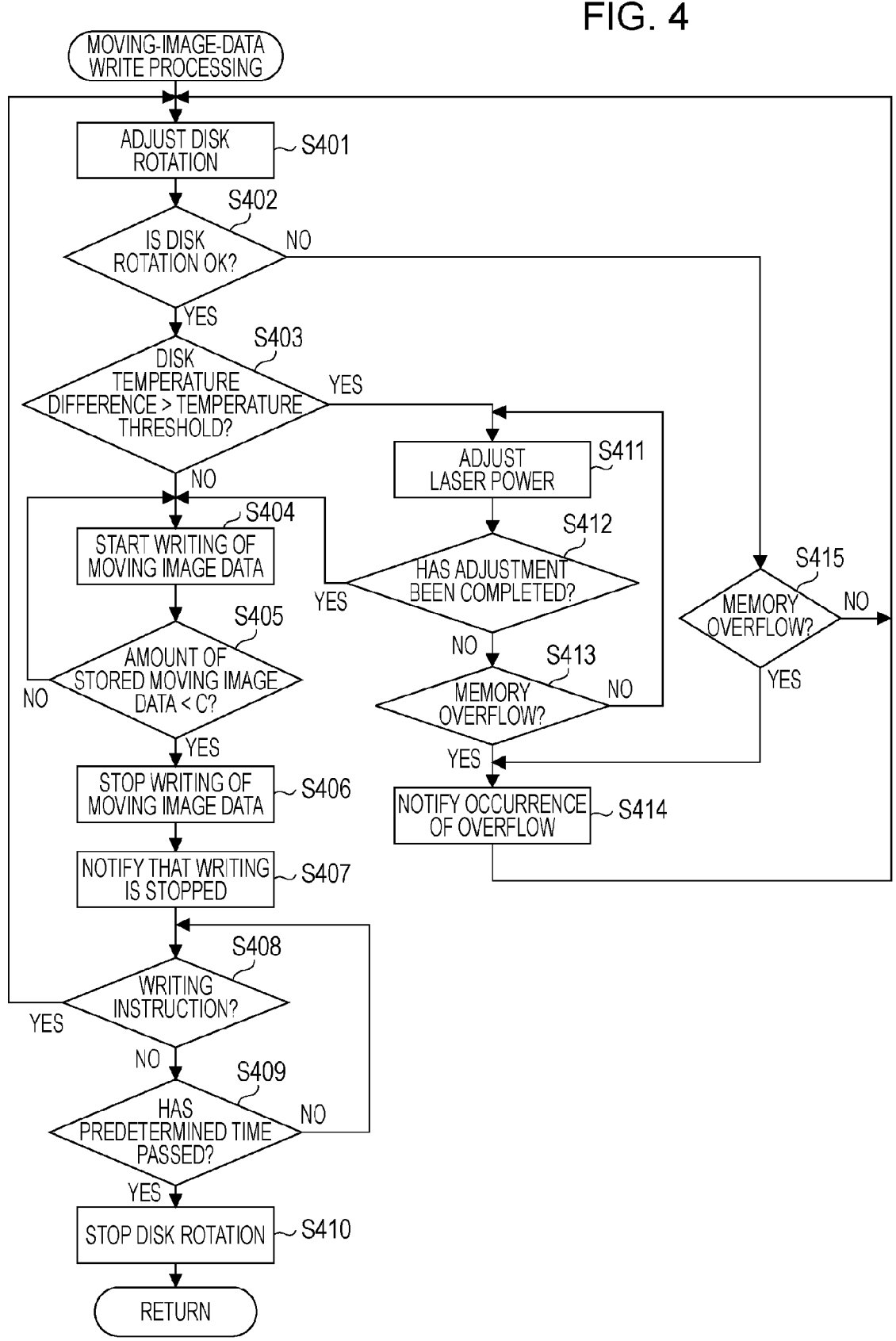
FIG. 4 is a flowchart showing write processing.

Thus, after the write processing shown in FIG. 4 is completed, within the predetermined time, the writing start threshold for the temporary storage unit 103 is set to the threshold A. After the predetermined time has passed since the execution of the write processing shown in FIG. 4, such as the issuance of an instruction to start recording, the writing start threshold for the temporary storage unit 103 is set to the threshold B.

Figure 5:
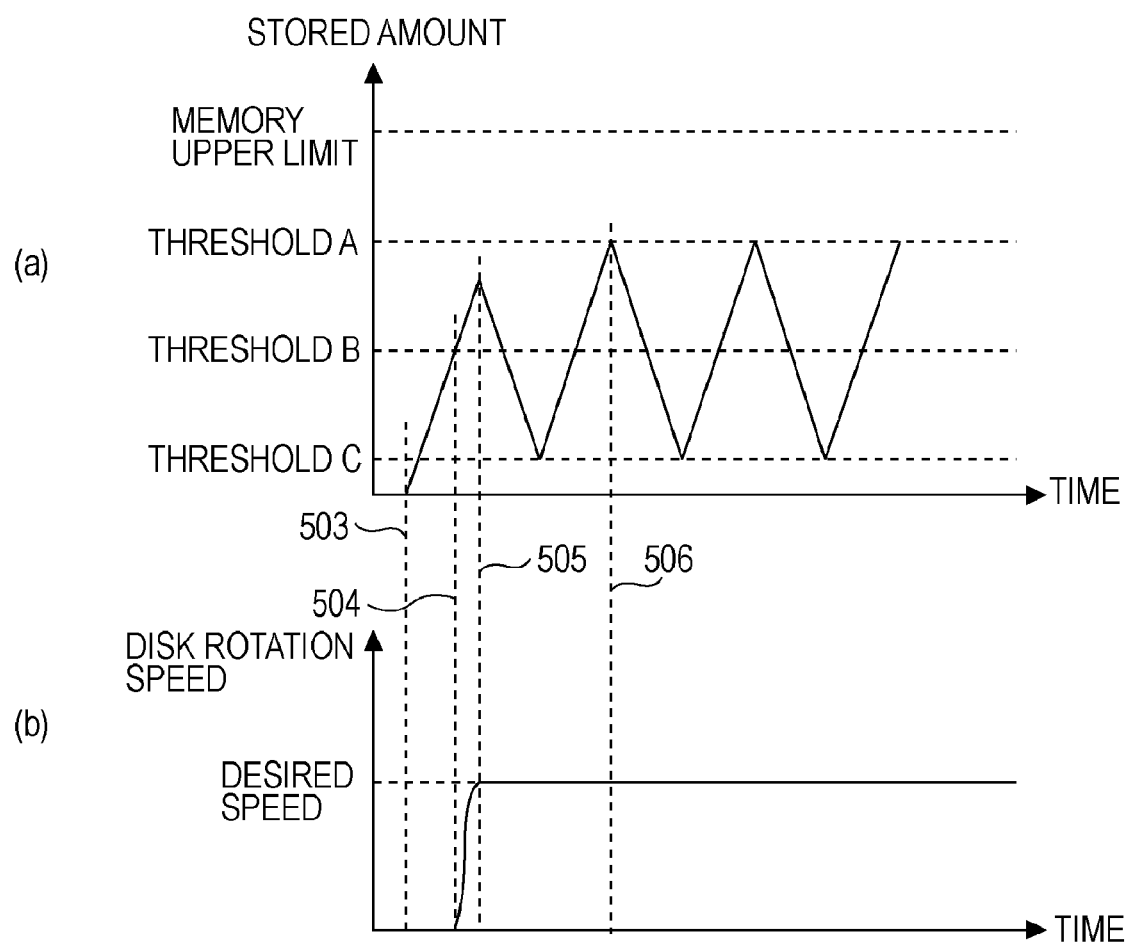
FIG. 5 shows the amount of data stored in a memory at the time of recording and the rotation state of a disk.

Part (a) of FIG. 5 shows the amount of data stored in the temporary storage unit 103 in the first embodiment, and Part (b) of FIG. 5 shows the rotation speed of the disk D.

In the first embodiment, the threshold A is obtained by subtracting a disturbance margin (for shockproof) in a recording operation from the upper limit of the amount of data that can be stored in the temporary storage unit 103.

The threshold B is obtained by subtracting a value, which is obtained by multiplying the worst time required for a change from a state in which the rotation of the disk D is stopped to a state in which the disk D is rotating at a desired speed by the rate of moving image data output from the encoding unit 102, from the threshold A.

Referring to part (a) of FIG. 5, after an instruction to start recording is issued at time 503, storing of moving image data into the temporary storage unit 103 is started. Then, at time 504 when the amount of stored moving image data exceeds the threshold B, the system controller 105 outputs a write command to the write control unit 104. However, as shown in part (b) of FIG. 5, since the rotation of the disk D is stopped at time 504, data cannot be written to the disk D. Then, at time 505 when the rotation speed of the disk D reaches the desired speed, data writing to the disk D is started. Then, writing to the disk D is stopped at a time when the amount of data stored in the temporary storage unit 103 decreases to the threshold C. Since the disk D is rotating at the desired speed, the threshold B is set. For the second and subsequent writing operations, a writing start command to start writing to the disk D is output at time 506 when the amount of data stored in the temporary storage unit 103 reaches the threshold A, and writing is performed.

As shown in part (a) of FIG. 5, in a case where an instruction to start recording is issued when the rotation of the disk D is stopped, a writing start command is output at a time when the amount of stored moving image data reaches the threshold B. Thus, after the writing start instruction is issued, there is a sufficient time for the amount of data stored in the temporary storage unit 103 reaching the upper limit, compared with the threshold A. Thus, it is less likely that moving image data overflows since writing to the disk D cannot be performed due to laser-power adjusting processing or the like.

As described above, according to the first embodiment, in a case where a recording instruction is issued in a state in which the rotation of the disk D is stopped, a threshold for writing to the disk D is set to be lower than a threshold used in a case where the disk D is rotating. Thus, writing start and writing stop are not frequently repeated. In addition, overflow of moving image data stored in the temporary storage unit 103 during a time required for the rotation speed of the disk D reaching a desired speed can be avoided.

Second Embodiment

A second embodiment of a recording apparatus in which a threshold of the amount of the moving image data stored in the temporary storage unit, used for determining start of a writing operation to write data onto a disk medium, is changed in accordance with the number of times writing operation to the disk medium has been performed will be described. Since the configuration of a recording apparatus 100 according to the second embodiment of the present invention is similar to the configuration of the recording apparatus 100 according to the first embodiment, the description of the functional configuration of the recording apparatus 100 according to the second embodiment will be omitted.

Figure 6:
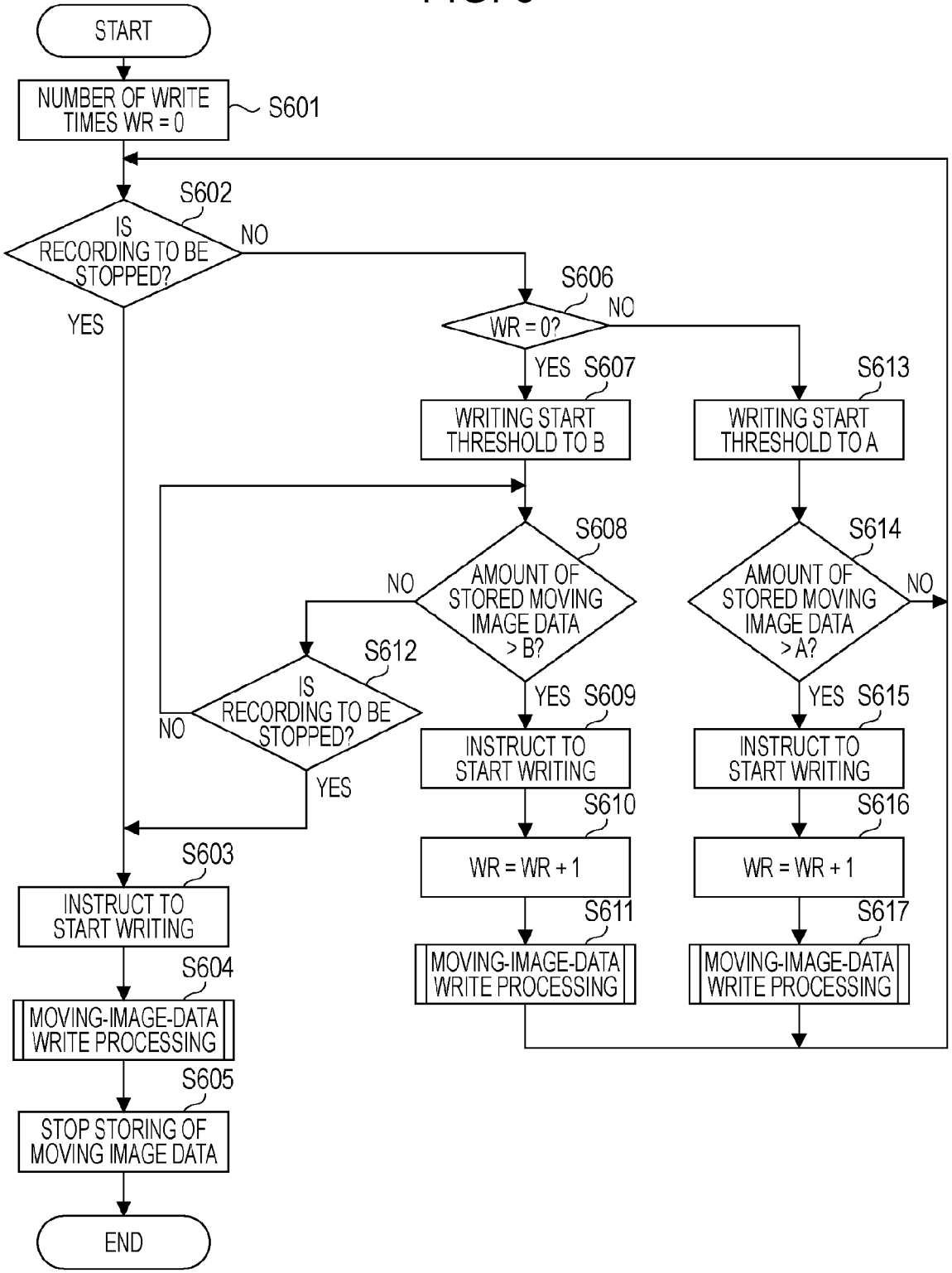
FIG. 6 is a flowchart showing a process performed at the time of recording according to a second embodiment of the present invention.

A recording process performed by the recording apparatus 100 according to the second embodiment will be described with reference to a flowchart shown in FIG. 6. The process shown in FIG. 6 is attained when the system controller 105 controls the units of the recording apparatus 100.

Upon receiving a recording instruction from a user via the operating unit 106, the encoding unit 102 starts encoding of moving image data. Then, the encoded moving image data is stored into the temporary storage unit 103. The system controller 105 sequentially acquires the amount of moving image data stored into the temporary storage unit 103.

In this state, a variable WR, which indicates the number of times writing has been performed since the issuance of a recording instruction, is set to 0 (step S601) Then, it is determined whether an instruction to stop recording has been issued from the user (step S602).

If it is determined in step S602 that an instruction to stop recording has not been received (if the determination in step S602 is NO), it is determined whether the variable WR is 0 (step S606).

If it is determined in step S606 that the variable WR is 0 (if the determination in step S606 is YES), the writing start threshold for the temporary storage unit 103 is set to the threshold B (step S607). Then, it is determined whether the amount of moving image data stored in the temporary storage unit 103 exceeds the threshold B (step S608).

If it is determined in step S608 that the amount of moving image data stored in the temporary storage unit 103 exceeds the threshold B (if the determination in step S608 is YES), a writing start command is output to the write control unit 104 (step S609). Then, the variable WR is incremented by one (step S610), and the write control unit 104 performs write processing (step S611). The write processing of step S611 is similar to the processing shown in FIG. 4. After the write processing of step S611 is completed, the process returns to step S602.

If it is determined in step S608 that the amount of moving image data stored in the temporary storage unit 103 does not exceed the threshold B (if the determination in step S608 is NO), it is determined whether an instruction to stop recording has been issued (step S612). If it is determined in step S612 that an instruction to stop recording has not been issued (if the determination in step S612 is NO), the process returns to step S608. If it is determined in step S612 that an instruction to stop recording has been issued (if the determination in step S612 is YES), a writing start command to start writing of moving image data is output to the write control unit 104 (step S603). Then, write processing for the disk D is performed (step S604). The write processing of step S604 is almost similar to the processing shown in FIG. 4. However, in the write processing of step S604, the determination of step S405 is not performed. In the write processing of step S604, after writing of all the moving image data stored in the temporary storage unit 103 to the disk D is completed, writing to the disk D is stopped. Then, storing of moving image data into the temporary storage unit 103 is stopped (step S605).

If it is determined in step S606 that the variable WR is not 0 (if the determination in step S606 is NO), that is, if the variable WR is 1 or more, the writing start threshold for the temporary storage unit 103 is set to the threshold A, which is larger than the threshold B (step S613). Then, it is determined whether the amount of moving image data stored in the temporary storage unit 103 exceeds the threshold A (step S614).

If it is determined in step S614 that the amount of moving image data stored in the temporary storage unit 103 exceeds the threshold A (if the determination in step S614 is YES), a writing start command is output to the write control unit 104 (step S615). Then, the variable WR is incremented by one (step S616), and the write control unit 104 performs write processing (step S617). The write processing of step S617 is similar to the processing shown in FIG. 4.

If it is determined in step S614 that the amount of moving image data stored in the temporary storage unit 103 does not exceed the threshold A (if the determination in step S614 is NO), the process returns to step S602.

If it is determined in step S602 that an instruction to stop recording has been issued (if the determination in step S602 is YES), a writing start command to start writing of moving image data is output to the write control unit 104 (step S603). Then, the write processing for the disk D is performed (step S604). Then, storing of moving image data into the temporary storage unit 103 is stopped (step S605).

Since a method for setting the thresholds A and B and the relationship between the amount of moving image data stored in the temporary storage unit 103 and the rotation speed of the disk D in the recording apparatus 100 according to the second embodiment are similar to those in the first embodiment, the description thereof will be omitted.

As described above, according to the second embodiment, a writing start threshold used in a case where a recording operation for the disk D is performed for the first time since the issuance of an instruction to start recording is set to be lower than a threshold used for the second and subsequent recording operations. Thus, writing start and writing stop are not frequently repeated. In addition, overflow of moving image data stored in the temporary storage unit 103 during a time required for the rotation speed of the disk D reaching a desired speed can be avoided.

Third Embodiment

A third embodiment of a recording apparatus in which a threshold of the amount of the moving image data stored in the temporary storage unit, used for determining start of a writing operation to write data onto a disk medium, is changed in accordance with a time elapsed since the stopping of the previous writing operation of the data on the disk medium will be described. Since the configuration of a recording apparatus 100 according to the third embodiment of the present invention is similar to the configuration of the recording apparatus 100 according to the first or second embodiment, the description of the functional configuration of the recording apparatus 100 according to the third embodiment will be omitted.

Figure 7:
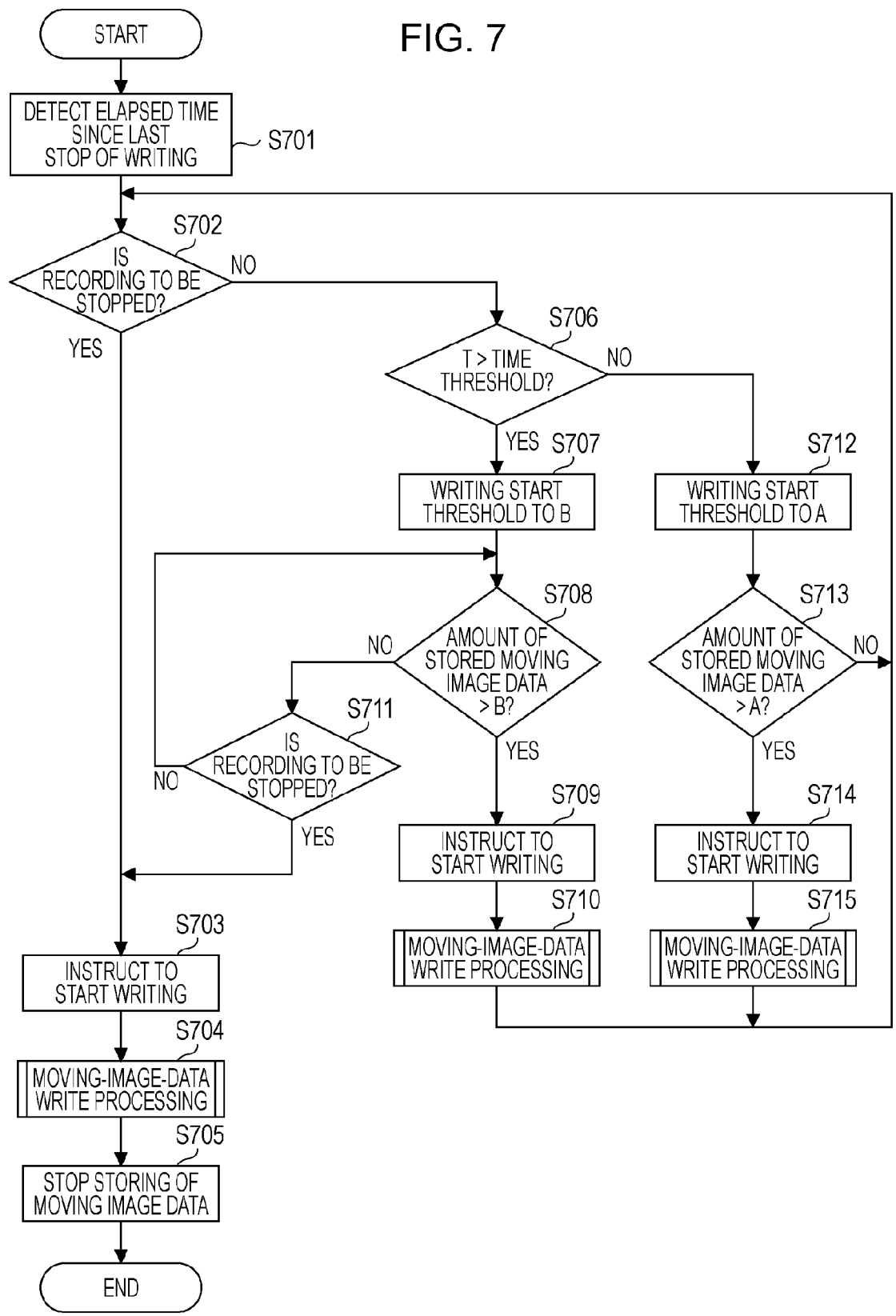
FIG. 7 is a flowchart showing a process performed at the time of recording according to a third embodiment of the present invention.

A recording process performed by the recording apparatus 100 according to the third embodiment will be described with reference to a flowchart shown in FIG. 7. The process shown in FIG. 7 is attained when the system controller 105 controls the units of the recording apparatus 100.

Upon receiving a recording instruction from a user via the operating unit 106, the encoding unit 102 starts encoding of moving image data. Then, the encoded moving image data is stored into the temporary storage unit 103. The system controller 105 sequentially acquires the amount of moving image data stored into the temporary storage unit 103.

An elapsed time T since the last stop of writing is detected (step S701). Then, it is determined whether an instruction to stop recording has been issued from the user (step S702).

If it is determined in step S702 that an instruction to stop recording has not been issued (if the determination in step S702 is NO), it is determined whether the elapsed time T exceeds a time threshold (step S706).

If it is determined in step S706 that the elapsed time T exceeds the time threshold (if the determination in step S706 is YES), the writing start threshold for the temporary storage unit 103 is set to the threshold B (step S707). Then, it is determined whether the amount of moving image data stored in the temporary storage unit 103 exceeds the threshold B (step S708).

If it is determined in step S708 that the amount of moving image data stored in the temporary storage unit 103 exceeds the threshold B (if the determination in step S708 is YES), a writing start command is output to the write control unit 104 (step S709). Then, the write control unit 104 performs write processing (step S710). The write processing of step S710 is similar to the processing shown in FIG. 4. After the write processing of step S710 is completed, the process returns to step S702.

If it is determined in step S708 that the amount of moving image data stored in the temporary storage unit 103 does not exceed the threshold B, it is determined whether an instruction to stop recording has been issued (step S711). If it is determined in step S711 that an instruction to stop recording has not been issued (if the determination in step S711 is NO), the process returns to step S708. If it is determined in step S711 that an instruction to stop recording has been issued (if the determination in step S711 is YES), a writing start command to start writing of moving image data is output to the write control unit 104 (step S703). Then, write processing for the disk D is performed (step S704). The write processing of step S704 is almost similar to the processing shown in FIG. 4. However, in the write processing of step S704, the determination of step S405 is not performed. In the write processing of step S704, after writing of all the moving image data stored in the temporary storage unit 103 to the disk D is completed, writing to the disk D is stopped. Then, storing of moving image data into the temporary storage unit 103 is stopped (step S705).

If it is determined in step S706 that the elapsed time T does not exceed the time threshold (if the determination in step S706 is NO), the writing start threshold for the temporary storage unit 103 is set to the threshold A, which is larger than the threshold B (step S712). Then, it is determined whether the amount of moving image data stored in the temporary storage unit 103 exceeds the threshold A (step S713).

If it is determined in step S713 that the amount of moving image data stored in the temporary storage unit 103 exceeds the threshold A (if the determination in step S713 is YES), a writing start command is output to the write control unit 104 (step S714). Then, the write control unit 104 performs write processing (step S715). The write processing of step S715 is similar to the processing shown in FIG. 4.

If it is determined in step S713 that the amount of moving image data stored in the temporary storage unit 103 does not exceed the threshold A (if the determination in step S713 is NO), the process returns to step S702.

If it is determined in step S702 that an instruction to stop recording has been issued (if the determination in step S702 is YES), a writing start command to start writing of moving image data is output to the write control unit 104 (step S703). Then, the write processing for the disk D is performed (step S704). Then, storing of moving image data into the temporary storage unit 103 is stopped (step S705).

Since a method for setting the thresholds A and B and the relationship between the amount of moving image data stored in the temporary storage unit 103 and the rotation speed of the disk D in the recording apparatus 100 according to the second embodiment are similar to those in the first embodiment, the description thereof will be omitted.

As described above, according to the third embodiment, a writing start threshold used in a case where the elapsed time since the last stop of writing to the disk D exceeds a time threshold is set to be smaller than a writing start threshold used in a case where the elapsed time does not exceed the time threshold.

Thus, a smaller writing start threshold is set in a case where, for example, a long time has passed since the last stop of writing and a certain period of time is required to adjust recording power.

Accordingly, writing start and writing stop are not frequently repeated. In addition, overflow of moving image data stored in the temporary storage unit 103 during a time required for the rotation speed of the disk D reaching a desired speed can be avoided.

Fourth Embodiment

Figure 8:
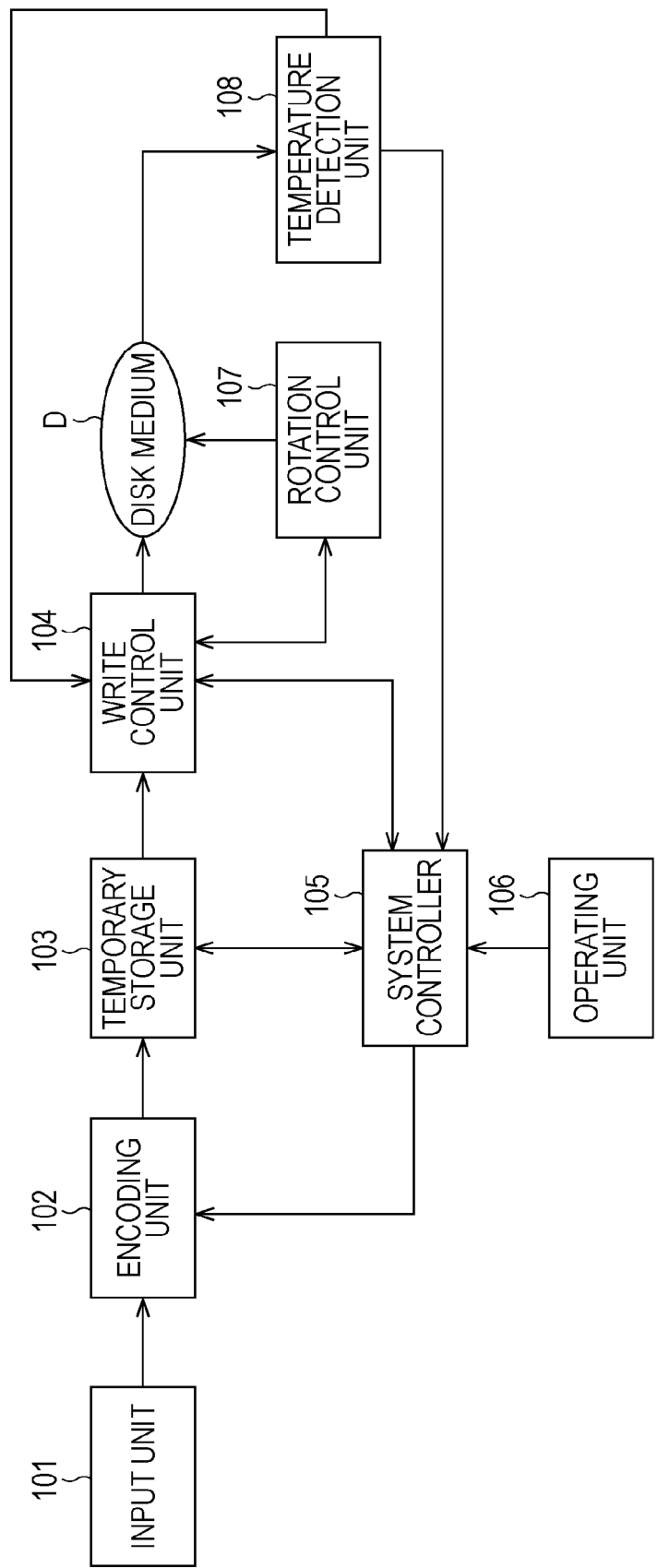
FIG. 8 shows the configuration of a recording apparatus according to a fourth embodiment of the present invention.

A fourth embodiment of a recording apparatus in which a threshold of the amount of the moving image data stored in the temporary storage unit, used for determining start of a writing operation to write data onto a disk medium, is changed in accordance with a temperature of the disk medium will be described. FIG. 8 shows the configuration of a recording apparatus 100 according to the fourth embodiment of the present invention. The configuration of the recording apparatus 100 shown in FIG. 8 is almost similar to the configuration of the recording apparatus 100 shown in FIG. 1. However, the recording apparatus 100 shown in FIG. 8 is different from the recording apparatus 100 shown in FIG. 1 in that temperature information detected by the temperature detection unit 108 is also supplied to the system controller 105 and temperature information at the time of laser power adjustment is supplied from the write control unit 104 to the system controller 105. Since the other configuration and processing are similar to those in the first to third embodiments, the description of the functional configuration of the recording apparatus 100 according to the fourth embodiment will be omitted.

As described above, an optimal laser power varies depending on the surface temperature of a disk. In the fourth embodiment, at the time of laser power adjustment, surface temperature information received from the temperature detection unit 108 is stored in association with an optimal laser power at that time in a register in the controller 202. When a difference between the stored temperature at the last laser power adjustment and the current surface temperature of the disk D reaches a predetermined value, laser power adjustment is performed again.

Figure 9:
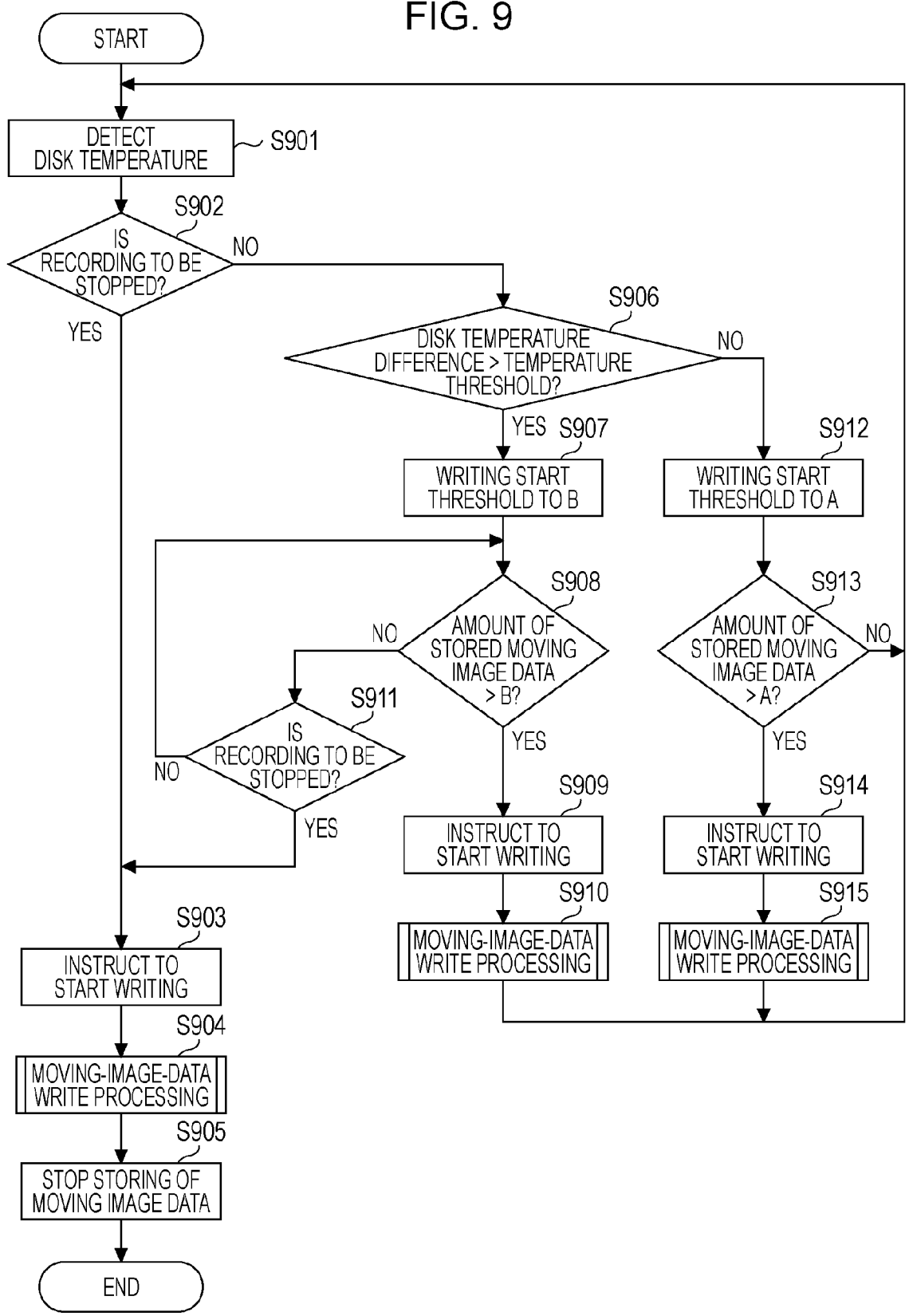
FIG. 9 is a flowchart showing a process performed at the time of recording according to the fourth embodiment.
Figure 10A:
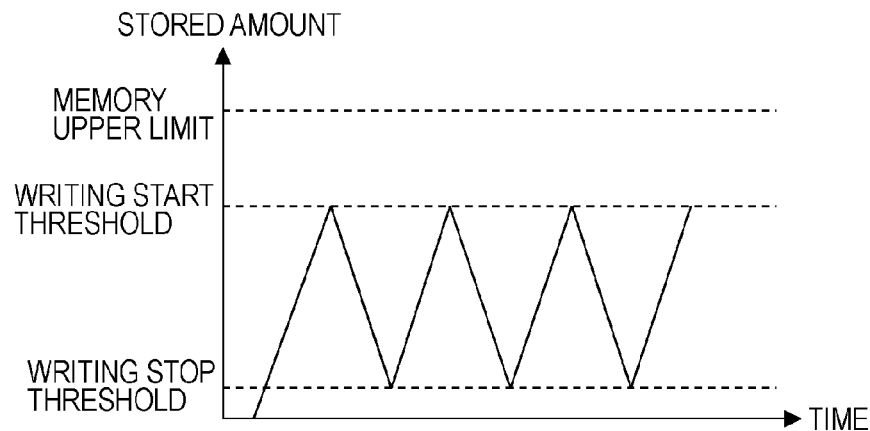
FIGS. 10A to 10C are illustrations each showing the amount of data stored in a memory at the time of recording.
Figure 10B:
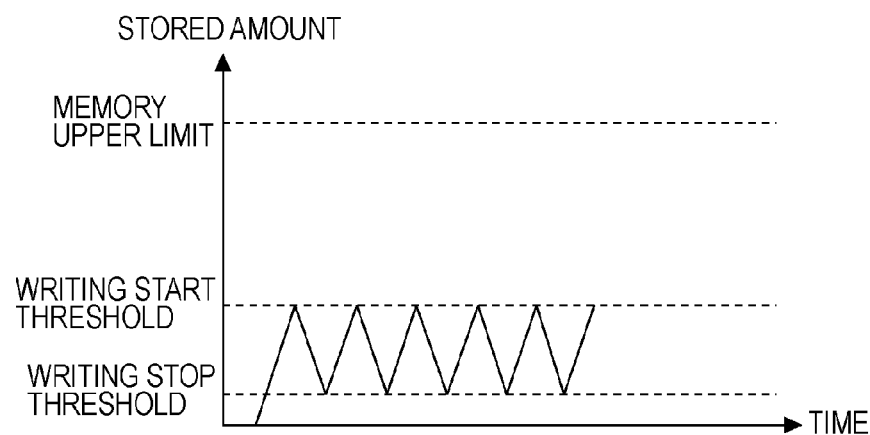
Figure 10C:
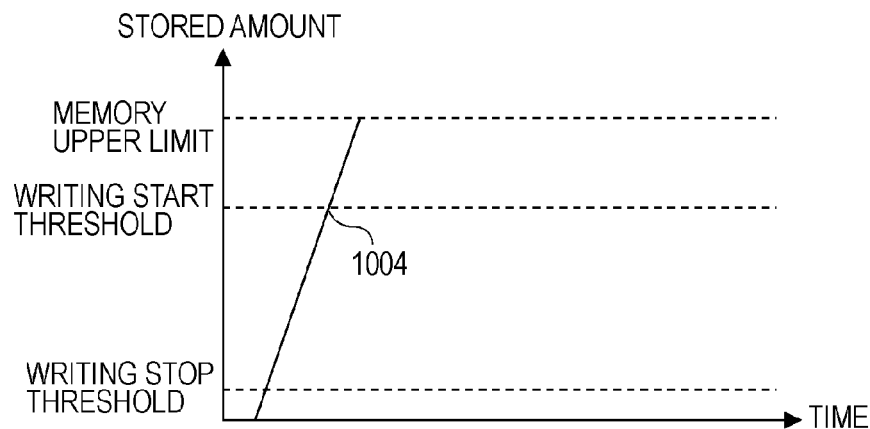

A recording process performed by the recording apparatus 100 according to the fourth embodiment will be described with reference to a flowchart shown in FIG. 9. The process shown in FIG. 9 is attained when the system controller 105 controls the units of the recording apparatus 100.

Upon receiving a recording instruction from a user via the operating unit 106, the encoding unit 102 starts encoding of moving image data. Then, the encoded moving image data is stored into the temporary storage unit 103. The system controller 105 sequentially acquires the amount of moving image data stored into the temporary storage unit 103.

Temperature information of the disk D detected by the temperature detection unit 108 is acquired (step S901). Then, it is determined whether an instruction to stop recording has been issued from the user (step S902).

If it is determined in step S902 that an instruction to stop recording has not been issued (if the determination in step S902 is NO), it is determined whether a difference between the temperature of the disk D at the time of laser power adjustment and the current temperature of the disk D exceeds a temperature threshold (step S906).

If it is determined in step S906 that the temperature difference exceeds the temperature threshold (if the determination in step S906 is YES), the writing start threshold for the temporary storage unit 103 is set to the threshold B (step S907). Then, it is determined whether the amount of moving image data stored in the temporary storage unit 103 exceeds the threshold B (step S908).

If it is determined in step S908 that the amount of moving image data stored in the temporary storage unit 103 exceeds the threshold B (if the determination in step S908 is YES), a writing start command is output to the write control unit 104 (step S909). Then, the write control unit 104 performs write processing (step S910). The write processing of step S910 is similar to the processing shown in FIG. 4. After the write processing of step S910 is completed, the process returns to step S901.

If it is determined in step S908 that the amount of moving image data stored in the temporary storage unit 103 does not exceed the threshold B (if the determination in step S908 is NO), it is determined whether an instruction to stop recording has been issued (step S911). If it is determined in step S911 that an instruction to stop recording has not been issued (if the determination in step S911 is NO), the process returns to step S908. If it is determined in step S911 that an instruction to stop recording has been issued (if the determination in step S911 is YES), a writing start command to start writing of moving image data is output to the write control unit 104 (step S903). Then, write processing for the disk D is performed (step S904). The write processing of step S904 is almost similar to the processing shown in FIG. 4. However, in the write processing of step S904, the determination of step S405 is not performed. In the write processing of step S904, after writing of all the moving image data stored in the temporary storage unit 103 to the disk D is completed, writing to the disk D is stopped. Then, storing of moving image data into the temporary storage unit 103 is stopped (step S905).

If it is determined in step S906 that the temperature difference does not exceed the temperature threshold (if the determination in step S906 is NO), the writing start threshold for the temporary storage unit 103 is set to the threshold A, which is larger than the threshold B (step S912). Then, it is determined whether the amount of moving image data stored in the temporary storage unit 103 exceeds the threshold A (step S913).

If it is determined in step S913 that the amount of moving image data stored in the temporary storage unit 103 exceeds the threshold A (if the determination in step S913 is YES), a writing start command is output to the write control unit 104 (step S914). Then, the write control unit 104 performs write processing (step S915). The write processing of step S915 is similar to the processing shown in FIG. 4.

If it is determined in step S913 that the amount of moving image data stored in the temporary storage unit 103 does not exceed the threshold A (if the determination in step S913 is NO), the process returns to step S901.

If it is determined in step S902 that an instruction to stop recording has been issued (if the determination in step S902 is YES), a writing start command to start writing of moving image data is output to the write control unit 104 (step S903). Then, the write processing for the disk D is performed (step S904). Then, storing of moving image data into the temporary storage unit 103 is stopped (step S905).

Since a method for setting the thresholds A and B and the relationship between the amount of moving image data stored in the temporary storage unit 103 and the rotation speed of the disk D in the recording apparatus 100 according to the fourth embodiment are similar to those in the first embodiment, the description thereof will be omitted.

As described above, according to the fourth embodiment, a smaller threshold is set in a case where a temperature change that is large enough for requiring readjustment of recording power occurs at the start of recording. Thus, an optimal laser power can be set for writing. In addition, overflow of moving image data stored in the temporary storage unit 103 can be avoided.

Other Embodiments

Units forming a recording apparatus and steps for a recording method according to each of the foregoing embodiments can be attained when a program stored in a random-access memory (RAM) or a read-only memory (ROM) of a computer runs. Such a program and a computer-readable storage medium on which such a program is recorded are also included in the scope of the present invention.

For example, the present invention can be implemented in various forms, such as a system, an apparatus, a method, a program, or a storage medium. More specifically, the present invention may be applied to a system including a plurality of apparatuses or to an apparatus including a single device.

The present invention is also applied to a case where software programs for attaining the functions of the foregoing embodiments (in the foregoing embodiments, programs corresponding to the flowcharts shown in FIGS. 3, 4, 6, 7, and 9) are supplied to a system or an apparatus directly or via remote control and a case where a computer of the system or the apparatus reads and executes the supplied program code.

Thus, in order to implement functional processing of an aspect of the present invention, a program code itself installed into the computer also implements the present invention. That is, a computer program itself for attaining functional processing of an aspect of the present invention also falls within the scope of the present invention.

In this case, the computer program may be of any type, such as an object code, a program to be executed by an interpreter, or script data to be supplied to an operating system (OS), as long as it has a function of a program.

As a storage medium for supplying a program, for example, a flexible disk, a hard disk, an optical disk, a magneto-optical disk (MO), a compact disc read-only memory (CD-ROM), a compact disc recordable (CD-R), a compact disc rewritable (CD-RW), a magnetic tape, a non-volatile memory card, a ROM, or a digital versatile disc (DVD) (including a DVD-ROM and a DVD-R) is available.

In addition, the program may be obtained by connecting to a website on the Internet using a browser of a client computer and by downloading a computer program according to an aspect of the present invention or a compressed file having an automatic installation function from the website to a storage medium, such as a hard disk.

In addition, a program according to an aspect of the present invention may be obtained by downloading a plurality of files obtained by dividing the program code constituting the program from different websites. That is, a World Wide Web (WWW) server for allowing a plurality of users to download a program file for attaining functional processing of an aspect of the present invention on a computer is also included in the scope of the present invention.

In addition, a program according to an aspect of the present invention may be encoded and stored in a recording medium, such as a CD-ROM, and may be distributed to users. Only a user who satisfies predetermined conditions may be able to download key information for decoding the encoded program from a website via the Internet. In addition, the encoded program can be executed by using the downloaded key information and can be installed to a computer.

In addition, the functions of the foregoing embodiments can be attained when the read program is executed by the computer. The functions of the foregoing embodiments can also be attained when part or all of the actual processing is performed by an operating system (OS) or the like running on the computer on the basis of instructions of the program.

Furthermore, the program read from the storage medium may be written to a memory arranged in a function expansion board inserted in the computer or a function expansion unit connected to the computer. The functions of the foregoing embodiments can also be attained when part or all of the actual processing is performed by the central processing unit (CPU) or the like arranged in the function expansion board or the function expansion unit on the basis of instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-039874 filed Feb. 20, 2007 and No. 2007-335220 filed Dec. 26, 2007, which are hereby incorporated by reference herein in their entirety.

What is claimed is:

1. A recording apparatus comprising:
a storage unit configured to store information data into a memory;
a write unit configured to read the information data stored in the memory and to write the read information data onto a disk-type recording medium by irradiating the disk-type recording medium with a beam in accordance with the information data; and
a control unit configured to, upon an amount of information data stored in the memory reaching a threshold, instruct the write unit to start writing of the information data,
wherein in response to the instruction from the control unit to start writing, the write unit reads the information data stored in the memory and writes the read information data onto the disk-type recording medium,
wherein after writing of the information data starts, upon the amount of information data stored in the memory decreasing to a predetermined value, the write unit stops reading of the information data from the memory and stops writing of the information data onto the disk-type recording medium, and wherein the control unit sets a value of the threshold in accordance with the number of times the write unit has performed writing of the information data.

2. The recording apparatus according to claim 1, further comprising an operating unit configured to issue an instruction to start recording of the information data, wherein when the write unit has not performed writing of the information data since the issuance of the instruction from the operating unit to start recording, the control unit sets the threshold to a second value, and wherein when the write unit has performed writing of the information data since the issuance of the instruction from the operating unit to start recording, the control unit sets the threshold to a first value, which is larger than the second value.

3. A recording apparatus comprising:

an input unit configured to input information data and to store the input information data in a memory;

a writing unit configured to read the information data from the memory and to write the information data read from the memory in a storage device;

a control unit configured to instruct the writing unit to start writing the information data in response to an amount of the information data stored in the memory reaching a threshold;

a receiving unit configured to receive a recording start instruction, wherein the writing unit starts to write the information data in the storage device in accordance with the instruction to start writing from the control unit, and stops to write the information data in the storage device in response to the amount of information data stored in the memory decreasing to a predetermined value, wherein the control unit repeatedly instructs the writing unit to start writing the information data and sets the threshold in accordance with the number of times the control unit has instructed the writing unit to start writing the information data after the receiving unit received the recording start instruction.

4. An apparatus according to claim 3, wherein the control unit:

sets the threshold to a first value so as to instruct to start writing the information data, in response to the amount of the information data stored in the memory reaching the first value, if the control unit has not instructed the writing unit to start writing the information after the receiving unit received the recording start instruction, and sets the threshold to a second value larger than the first value so as to instruct to start writing the information data, in response to the amount of the information data stored in the memory reaching the second value, if the control unit has instructed the writing unit to start writing the information after the receiving unit received the recording start instruction.

5. An apparatus according to claim 3, wherein the information data includes moving image data and the input unit includes a coding unit configured to encode the moving image data, and wherein the input unit stores the moving image data encoded by the coding unit in the memory.

6. An apparatus according to claim 3, wherein the writing unit outputs to the control unit information indicating that writing is stopped in response to the writing unit stopping writing the information data in the storage device.

7. A recording apparatus comprising:

an input unit configured to input information data and to store the input information data in a memory;

a writing unit configured to read the information data from the memory and to write the information data read from the memory in a storage device;

a control unit configured to instruct the writing unit to start writing the information data in response to an amount of the information data stored in the memory reaching a threshold;

a receiving unit configured to receive a recording start instruction, wherein the writing unit starts to write the information data in the storage device in accordance with the instruction to start writing from the control unit, and stops to write the information data in the storage device in response to the amount of information data stored in the memory decreasing to a predetermined value, and wherein the control unit sets the threshold to a first value for instructing first the writing unit to start writing the information data after the receiving unit received the recording start instruction so as to instruct first the writing unit to start writing the information data in response to the amount of the information data stored in the memory reaching the first value, and sets the threshold to a second value larger than the first value after the control unit instructed first to start recording so as to instruct the writing unit to start writing the information data in response to the amount of the information data stored in the memory reaching the second value.

8. An apparatus according to claim 7, wherein the information data includes moving image data and the input unit includes a coding unit configured to encode the moving image data, and wherein the input unit stores the moving image data encoded by the coding unit in the memory.

9. An apparatus according to claim 7, wherein the writing unit outputs to the control unit information indicating that writing is stopped in response to the writing unit stopping writing of the information data in the storage device.

* * * * *